United States Patent [19]

Dockus

[11] 4,028,200

[45] June 7, 1977

[54] PLATING BATHS FOR DEPOSITING COBALT-LEAD NICKEL-LEAD ALLOYS OR COMBINATIONS THEREOF AND METHOD OF COATING ALUMINUM ARTICLES THEREWITH

[75] Inventor: Kostas F. Dockus, Cicero, Ill.

[73] Assignee: Borg-Warner Corporation, Chicago, Ill.

[22] Filed: May 3, 1976

[21] Appl. No.: 682,885

Related U.S. Application Data

[60] Division of Ser. No. 589,992, June 24, 1975, Pat. No. 3,970,237, which is a continuation-in-part of Ser. No. 304,457, Nov. 7, 1972, abandoned.

[52] U.S. Cl. .................................. 204/43 T; 106/1; 427/437; 427/438

[51] Int. Cl.$^2$ ...................... C25D 3/56; C23C 3/00; C23C 3/02

[58] Field of Search ................ 204/43 T, 43 S, 123; 106/1; 427/436, 437, 438

[56] References Cited

FOREIGN PATENTS OR APPLICATIONS 1,035,891  9/1953  France .............................. 204/43 T

*Primary Examiner*—G. L. Kaplan
*Attorney, Agent, or Firm*—James A. Geppert

[57] ABSTRACT

A method of plating cobalt-lead or nickel-lead alloys upon aluminum base articles. The plating baths comprise salts of the plating metals and have a pH of from 7–12. Both electroless and electroplating bath compositions are disclosed.

13 Claims, No Drawings

PLATING BATHS FOR DEPOSITING COBALT-LEAD NICKEL-LEAD ALLOYS OR COMBINATIONS THEREOF AND METHOD OF COATING ALUMINUM ARTICLES THEREWITH

This is a division of application Ser. No. 589,992 filed June 24, 1975 and now U.S. Pat. No. 3,970,237 which in turn was a continuation-in-part of application Ser. No. 304,457 filed Nov. 7, 1972, now abandoned.

BACKGROUND OF THE INVENTION

Prior to the instant invention, plating of aluminum with a bond-promoting metal, such as nickel and/or cobalt, was accomplished by a variety of methods. Included in the prior methods were plating techniques which employed acidic plating media, as for example, the technique set forth in U.S. Pat. No. 1,837,835. Also, a conventional electroless deposition from a hypophosphite solution is set forth in U.S. Pat. No. 2,532,283. The latter deposition provides bright coatings having aesthetic appeal, however, these coatings are inferior to those coatings provided by thermal decomposition or vacuum deposition processes when the coating is to be used in a bonding step. Thus, when a coated part prepared by conventional plating methods is employed in a subsequent bonding operation, the bond produced is often inadequate.

U.S. Pat. No. 3,482,305 discloses a brazing method wherein a bond-promoting metal is used in conjunction with the brazing of aluminum. The instant invention utilizes an improved bond-promoting plating where the plated aluminum article is to be bonded to another metal article, such as by brazing of aluminum, and optimizes the bonding process.

SUMMARY OF THE INVENTION

The instant invention relates to the brazing of one aluminum article to another article which may be formed of aluminum or other metals and to the method for plating of aluminum and aluminum alloys with a bond-promoting metal.

Among the objects of the present invention is the provision of a method of brazing one aluminum part to another part formed either of aluminum or another suitable metal or alloy. To accomplish the brazing operation, the aluminum part is plated with a bond-promoting metal, wherein an aluminum braze-clad surface on the part or aluminum brazing foil to be positioned between the parts is plated with the bond-promoting metal prior to brazing.

Another object of the present invention is the provision of a method of plating aluminum or aluminum alloys with a bond-promoting metal of nickel-lead, cobalt-lead or combinations thereof, in a form which is uniquely suited for subsequent bonding processes. The plating may be accomplished by displacement, electroless or electrolytic means and is accomplished under highly controlled conditions to achieve optimum results.

A further object of the present invention is the provision of novel plating baths for either the electroless or electrolytic plating technique. The plating bath includes a nickel and/or cobalt salt and, in addition lead salts in an amount of from about 50 ppm to about 10% of the total metal salts used to enhance the plating as a bond-promoting metal.

Other objects and advantages of the invention will be apparent from the following detailed description of the preferred embodiments thereof.

THE INVENTION

The instant invention relates to a method for brazing aluminum parts to other parts made of aluminum or other suitable metals, and also to the method of plating of aluminum and aluminum alloys with a bond-promoting metal of nickel, nickel-lead, cobalt, cobalt-lead and cobalt-nickel-lead combinations for an aluminum alloy surface in a form which is uniquely suited for subsequent bonding processes. The plating may be accomplished by displacement, electroless or electrolytic means and is accomplished under highly controlled conditions to achieve optimum results. It is essential that the plating bath, comprised of given metal salts, be maintained in an alkaline condition. Further, it has been found that the addition of lead salts, in an amount of from about 50 ppm to about 10% of the total metal salts used, causes the plated coatings to be particularly useful as a bond-promoting metal when used as such in a subsequent bonding step. The presence of the lead salt provides a deposition of the nickel-lead and/or cobalt-lead combinations to take the form of finely divided sponge-like particles which are uniquely suited to bonding processes by virtue of their high degree of action in promoting the wetting of aluminum parts.

The composition of the plating bath will, of course, depend on the kind of deposition that is occurring, i.e., whether it is electroless or electrolytic and the specific compositions are set forth in the specification hereinbelow.

When plating is used as a step in the prior art brazing process of joining one aluminum part to another, a bond promoting alloy, for example, nickel, cobalt or the like is plated on an aluminum braze-clad surface, or on the surface of a foil made of brazing alloy, in preparation for brazing. The brazing clad or brazing foil is an alloy such as aluminum-silicon alloy. It is preferred that the bond-promoting alloy that is plated on the braze metal completely cover the brazing metal. This requires at least 0.3 weight percent or 0.1 thickness percent of the total bond-promoting-alloy/brazing-alloy combination. Also, it is preferred that the amount of bond-promoting alloy not exceed about 7 weight percent of the total alloy plate plus braze-metal combination. If the amount does exceed about 7 weight percent, the bond-promoting metal, such as nickel, will react with the aluminum to form an excessive amount of aluminide film which is deleterious to proper bond formation. The thickness of the bond-promoting alloy plated on the aluminum brazing alloy is preferably about 0.1% to about 2.5% of the total thickness of the bond-promoting alloy-brazing alloy combination. The application of the plated coating, e.g., of nickel, is such that upon heating, the nickel reacts with the aluminum and silicon of the brazing alloy, if such a combination is used, to form an eutectic that will melt at 1050° F. In accordance with the prior art, fillet formation results from favorable interfacial tension produced by the proper reaction of bond-promoting alloy and brazing metal which promotes the wetting action of the resultant new brazing alloy. The process of the instant invention provides the bond-promoting metal plate in the novel form of a finely divided sponge-like deposit which optimizes fillet formation in the brazing process by promoting the reaction of the plate with the brazing metal to produce a highly favorable wetting action.

In the plating of the bond-promoting alloy onto the brazing alloy, such as aluminum-silicon, cladding surface, or onto a brazing foil, a proper plating bath must be provided. The plating as mentioned may occur either as displacement, electrolytic or electroless plating and the particular combination disclosed by the instant invention of an alkaline media containing an added lead salt is quite well applicable to all such plating processes.

In the electrolytic plating of the bond-promoting alloy, such as nickel-lead or cobalt-lead, it is preferable that a metal salt, such as nickel or cobalt sulfate, be combined with a metal salt containing a chloride ion such as nickel or cobalt chloride. It is also required that a lead ion be present in the form of a lead salt such as lead acetate. The bath is prepared which is basic in pH. The bath may be made basic by adding a base such as an alkali metal hydroxide or ammonium hydroxide. The total composition is buffered by adding a buffer, for example, sodium citrate or sodium gluconate. The temperature of the bath during plating may vary from about 80° F to about 160° F and the pH ranges from 7 to about 12, i.e. on the basic side.

In the electroless plating of the bond-promoting alloy there is a plating solution similar to that of the electrolytic except that it is not required that there be a chloride ion present provided by a metal salt. The bond-promoting alloy in this process is plated by a displacement, i.e., oxidation-reduction reaction. In the case of nickel, it is: $2Al° + 3Ni^{++} \rightarrow 2Al^{+++} + 3Ni°$. In other electroless processes that could be used, nickel is plated by a reducing reaction, e.g., $NiSO_4 + NaH_2PO_2 + H_2O \rightarrow Ni° + NaH_2PO_3 + H_2SO_4$. The bond-promoting alloys may be within the same class as those used in the electrolytic plating and illustrative ranges of components are set forth hereinbelow both for the electrolytic and electroless plating bath.

In the tables hereinbelow, the illustrative baths show the percentage of each of the different components used for optimum plating of the alloys on an aluminum brazing-alloy surface.

TABLE I

Electroless Nickel-Lead Alloy Plating Bath

| Composition | Range | % Range w/o** | Preferred Amount | w/o** | Substitute | Range | Preferred Amount |
|---|---|---|---|---|---|---|---|
| 1. Nickel Sulfate | 30–200g/l | 3.0–20.0 | 100.0g/l | 10.0 | | | |
| 2. Sodium Citrate | 30–300g/l | 3.0–30.0 | 200.0g/l | 20.0 | Sodium Gluconate | 30–200g/l | 150.0g/l |
| 3. Lead Acetate | 0.05–10.0g/l | 0.005–1.0 | 1.0g/l | 0.1 | Lead Citrate or Bismuth Lactate | 0.05–5.0g/l 0.25–5.0g/l | 1.0g/l 1.0g/l |
| 4. Ammonium ($NH_3$=30% Hydroxide) | 25–150ml/l | 2.5–15.0 | 75ml/l | 7.5 | | | |
| 5. Temperature | 180°–200°E | | 180°F | | | | |
| 6*. pH | 7.0–12.0 | | 10.5 | | | | |

TABLE II

Electroless Cobalt-Lead Alloy Plating Bath

| Composition | Range | % Range w/o** | Preferred Amount | w.o** | substitute | Range | preferred Amount |
|---|---|---|---|---|---|---|---|
| 1. Cobalt Sulfate | 30–200g/l | 3.0–20.0 | 100.0g/l | 10.0 | | | |
| 2. Sodium Citrate | 30–300g/l | 3.0–30.0 | 200.0g/l | 20.0 | Sodium Gluconate | 30–200g/l | 150.0g/l |
| 3. Lead Acetate | 0.05–10.0g/l | 0.005–1.0 | 1.0g/l | 0.1 | Lead Citrate or Bismuth Lactate | 0.05–5.0g/l | 1.0g/l |
| 4. Ammonium ($NH_3$=30%) Hydroxide | 25–150ml/l | 2.5–15.0 | 75ml/l | 7.5 | | | |
| 5. Temperature | 180°–200° F | | 180° F | | | | |
| 6. pH | 7.0–12.0 | | 10.5 | | | | |

TABLE III

Electroless Nickel-Cobalt-Lead Alloy Plating Bath

| Composition | Range | % Range w/o** | Preferred Amount | w/o** | Substitute | Range | Preferred Amount |
|---|---|---|---|---|---|---|---|
| 1. Nickel Sulfate | 30–100g/l | 3.0–10.0 | 50g/l | 5.0 | | | |
| 2. Cobalt Sulfate | 100–30g/l | 10.0–3.0 | 50g/l | 5.0 | | | |
| 3. Sodium Citrate | 60–300g/l | 6.0–30.0 | 200g/l | 20.0 | Sodium Gluconate | 60–300g/l | 150g/l |
| 4. Lead Acetate | 0.05–10.0g/l | 0.005–1.0 | 1.0g/l | 0.1 | Lead Citrate or Bismuth Lactate | 0.05–5.0g/l | 1.0g/l |
| 5. Ammonium ($NH_3$=30%) Hydroxide | 25–150ml/l | 2.5–15.0 | 75ml/l | 7.5 | | | |
| 6. Temperature | 180°–200° F | | 180°F | | | | |
| 7*. pH | 7.0–12.0 | | 0.5 | | | | |

TABLE IV

Electrolytic Nickel-Lead Alloy Plating Bath

| Composition | Range | % Range w/o** | Preferred Amount | w/o** | Substitute | Range | Preferred Amount |
|---|---|---|---|---|---|---|---|
| 1. Nickel Sulfate | 30–200g/l | 3.0–20.0 | 50g/l | 5.0 | | | |
| 2. Nickel Chloride | 100–10g/l | 10.0–1.0 | 50g/l | 5.0 | | | |
| 3. Sodium Citrate | 60–300g/l | 6.0–30.0 | 100g/l | 10.0 | Sodium Gluconate | 60–300g/l | 150.0g/l |
| 4. Lead Acetate | 0.05–10.0g/l | 0.005–1.0 | 1.0g/l | 0.1 | Lead Citrate or Bismuth Lactate | 0.05–5.0g/l | 1.0g/l |
| 5. Ammonium Hydroxide | 5ml–150ml/l | 0.5–15.0 | 75ml/l | 7.5 | | | |
| 6. Temperature | 80°–160° F | | 80° F | | | | |
| 7*. pH | 7.0–12.0 | | 10.5 | | | 10.5 | 10.5 |

TABLE V

Electrolytic Cobalt-Lead Alloy Plating Bath

| Composition | Range | % Range w/o* | Preferred Amount | w/o** | Substitute | Range | Preferred Amount |
|---|---|---|---|---|---|---|---|
| 1. Colbalt Sulfate | 30–200g/l | 3.0–20.0 | 50g/l | 5.0 | | | |
| 2. Cobalt Chloride | 100–10g/l | 10.0–1.0 | 50g/l | 5.0 | | | |
| 3. Sodium Citrate | 60–300g/l | 6.0–30.0 | 100g/l | 10.0 | Sodium Gluconate | 60–300g/l | 150.0g/l |
| 4. Lead Acetate | 0.05–10.0g/l | .005–1.0 | 1.0g/l | 0.1 | Lead Citrate or Bismuth Lactate | 0.05–5.0g/l | 1.0g/l |
| 5. Ammonium Hydroxide | 5ml–175ml/l | 0.5–7.5 | 75ml/l | 7.5 | | | |
| 6. Temperature | 80°–160° F | | 80° F | | | | |
| 7*. pH | 7.0–12.0 | | 10.5 | | | 10.5 | 10.5 |

TABLE VI

Electrolytic Nickel-Cobalt-Lead Alloy Plating Bath

| Composition | Range | % Range w/o** | Preferred Amount | w/o** | Substitute | Range | Preferred Amount |
|---|---|---|---|---|---|---|---|
| 1. Nickel Sulfate | 30–300g/l | 3.0–30.0 | 50g/l | 5.0 | | | |
| 2. Cobalt Chloride | 100–10g/l | 10.0–1.0 | 50g/l | 5.0 | | | |
| 3. Sodium Citrate | 60–300g/l | 6.0–30.0 | 100g/l | 10.0 | Sodium Gluconate | 60–300g/l | 150.0g/l |
| 4. Lead Acetate | 0.05–10.0g/l | .005–1.0 | 1.0g/l | 0.1 | Lead Citrate or Bismuth Lacate | 0.05–5.0g/l | 1.0g/l |
| 5. Ammonium Hydroxide | 5–150ml/l | 0.5–15.0 | 75ml/l | 7.5 | | | |
| 6. Temperature | 80°–160° F | | 89° F | | | | |
| 7*. pH | 7.0–12.0 | | 10.5 | | | | |

*In each of the baths set forth in the tables the remaining percent to total 100% is made up of water.
**Weight Percent.

It will be noted that the examples show plating solutions that have been made basic through the addition of ammonium hydroxide, however, other base solutions are equally operable. The addition of a base provides a deposit made up of small, spongy particles of bond promoting alloy which are normally less than 100 microinches in diameter. The smaller the particles, of course, the better will the surface be covered on the aluminum base alloy. The completely covered areas serve as nuclei for the wetting action of the brazing alloy.

It has been found that the preferred thickness of the bond-promoting alloy, e.g. nickel-lead, on the aluminum-brazing alloy deposited through the plating process should be in excess of 3 microinches of bond-promoting alloy as measured by an electrolytic dissolution method, employing for example a Kocour Electronic Thickness Tester, and the optimum thickness is about 20 microinches. However, the amount of nickel-lead alloy is dependent upon the brazing-alloy thickness and, as previously mentioned, should not exceed 7% by weight of the total brazing-alloy weight. Thus, when the braze-alloy is reduced to extremely thin coatings, which is normal in heat exchangers (especially in thin heat exchanger plates), the braze-alloy thickness can be as low as 1 mil. In certain instances, it may be necessary, in order to keep below the 7% total nickel, to go below the preferred 20 microinches thickness of nickel-lead. If excessive thickness is utilized, the nickel tends to react with the aluminum to form an excessive amount of nickel aluminide and interfere with optimum fillet formation.

When the plating of the bond-promoting metal is used as a step in brazing of one aluminum part to another, the parts are placed in contact with each other in an inert atmosphere (either with or without pressure) at a temperature of from about 1050° F to 1150° F for a brief period of time. The contact time is generally a couple of minutes to allow melting and spreading of the brazing alloy and in turn cause a bond with the bond-promoting metal.

Although the methods of the present invention are disclosed as primarily employed for the bonding of aluminum parts together, as in the thin aluminum plates of a heat exchanger, the methods are also useful for the brazing or soldering of one part formed of aluminum or aluminum alloy to a second non-aluminum part formed of a metal or alloy, such as steel, stainless steel, nickel, nickel alloy, titanium or any aluminized metal.

More specifically, all aluminum alloys that can be brazed to each other can be simultaneously brazed to the above-mentioned other metals, if these metals are coated with a deposit of nickel, nickel-lead, cobalt, cobalt-lead or combinations thereof. Nickel or cobalt or their alloys can be brazed directly to the aluminum part without plating, if the aluminum filler alloy is coated with nickel, nickel-lead, cobalt, cobalt-lead or combinations thereof. Wettability of the surfaces is markedly improved if both members of the composite joints are coated with one of the plating materials. As with the brazing of aluminum parts together, a key feature of this invention for brazing aluminum parts to parts of other metals is the reaction between the deposit of plating material and the aluminum filler metal (aluminum braze clad) to form a new bonding alloy in situ at the joint, which in turn readily wets the composite components and promotes the flow of the brazing alloy into the joints. Without the deposit of plating material, the mild steel and stainless steel surfaces were not wetted at all, but aluminized steel formed sound joints. The titanium alloy wetted only sporadically.

A series of experiments were conducted for the brazing of aluminum to other metals, with one part of the braze junction formed of an aluminum alloy sheet clad with a 10% silicon alloy. The aluminum component was coated with an electroless nickel-lead or cobalt-lead alloy. The following metals, both with and without electroless nickel-lead or cobalt-lead alloy, were utilized as the second components in the brazing operation: aluminized steel, mild steel, stainless steel and titanium. All coated specimens had the same thickness of electroless plating of the bond-promoting alloy and were brazed at 1120 ± 10° F for five minutes in a nitrogen atmosphere of less than −60° F dew point.

Considering each of the metal components, the aluminized steel brazed to the aluminum alloy exhibited good wetting properties with generous fillets and complete bond along the interface where the specimen was precoated with the nickel-lead alloy. On the steel specimen not coated with the nickel alloy, a complete bond was formed in the interface but lower fluidity minimized the amount of fillet formation. Both types of specimens produced good joints with no evidence of cracking in the braze junction.

For titanium without electroless nickel-lead, only occasional bonding occurred where the two joint members were in close contact. There was little wetting and no fillet formation. However, on the coated titanium specimen, wetting was sufficient to form a complete bond with fillets almost as large as in the aluminized steel specimen. An examination of the brazed joints showed that the nickel-lead deposit was lifted from the titanium and then reacted to form a continuous band of nickel-based compounds while suspended in the melt. There is a very little but definite reaction of the liquid brazing alloy with the titanium metal to form a thin layer of compound particles. There was no evidence of cracking in the braze.

In the mild steel specimens, without the nickel-lead plating there was no wetting of the mild steel even where there was intimate contact between the mild steel and aluminum alloy pieces. The nickel-lead coated mild steel had good wetting action with generous fillet formation almost of the quality of the aluminized steel. The nickel deposits from both the steel and aluminum pieces cause the formation of a continuous layer of nickel compounds, and there was no evidence of cracking in the specimen.

Stainless steel behaved in the same manner as the mild steel with substantially no wettability without the nickel-lead coating and good wetting with the coating. During the brazing cycle, the nickel deposits and the brazing alloy reacted with the stainless steel to form a continuous compound layer, similar in appearance to that occurring on the aluminized steel. However, some cracking did occur.

On the other hand, attempts to use copper for the other piece was not successful. During the brazing cycle, the reaction between the liquid brazing alloy, the copper and the aluminum sheet was so great as to completely melt the aluminum. These specimens were unsatisfactory.

Although the invention, set forth hereinabove, has been illustrated with reference to certain specific bond-promoting metal salts and certain lead salts, the plating may be accomplished with other substituents than those specifically set forth. Modifications in the plating methods will be apparent to those skilled in the art of plating and the scope of the invention is defined by the claims which are appended hereto.

I claim:

1. In a process for plating on aluminum and aluminum alloy surfaces, metals selected from the group consisting of nickel, cobalt and combinations thereof employing an aqueous plating bath containing the dissolved salts of the plating metals and buffering salts, the combination wherein:

the pH of said plating bath is maintained in the range of from pH 7 to about pH 12 by the addition of a base selected from the group consisting of alkali metal hydroxides and ammonium hydroxide, and from about 0.005% by weight to about 1.0% by weight of a lead salt based on the total plating bath composition is added thereto, whereby the resultant plating on the aluminum and aluminum alloy surfaces is deposited in the form of small, finely divided sponge-like particles not exceeding 100 microinches in diameter.

2. The combination of claim 1 wherein the base employed is ammonium hydroxide.

3. The combination of claim 1 wherein the base employed is ammonium hydroxide and the pH of the plating bath is maintained in the range of 10.0 to 11.0.

4. The combination of claim 3 wherein the lead salt is selected from the group consisting of lead acetate and lead citrate.

5. A plating bath for electrodepositing on aluminum and aluminum alloy surfaces metals selected from the group consisting of nickel-lead, cobalt-lead and combinations thereof, consisting of an aqueous solution of:

from about 3 to about 20 weight percent of a metal sulfate selected from the group consisting of nickel sulfate and cobalt sulfate, and from about 3 to about 10 weight percent of a metal chloride selected from the group consisting of nickel chloride and cobalt chloride, and from about 6 to about 30 weight percent of a buffering salt selected from the group consisting of sodium citrate and sodium glyconate, and from about 0.005 to about 1.0 weight percent of a lead salt selected from the group consisting of lead acetate and lead citrate;

the said plating bath being adjusted to a pH value in the range of 7 to 12.

6. A plating bath for electroless deposition on aluminum and aluminum alloy surfaces metals selected from the group consisting of nickel-lead, cobalt-lead and combinations thereof, consisting of an aqueous solution of:

from about 3 to about 20 weight percent of at least one metal sulfate selected from the group consisting of nickel sulfate and cobalt sulfate, and from about 3 to about 30 weight percent of a buffering salt selected from the group consisting of sodium gluconate and sodium citrate, and from about 0.005 to about 1.0 weight percent of a lead salt selected from the group consisting of lead acetate and lead citrate;

the said plating bath being neutralized to a pH value in the range of 8 to 12.

7. A plating bath for the deposition on aluminum and aluminum alloy surfaces of metals selected from the group of nickel-lead, cobalt-lead and combinations thereof, comprising an aqueous bath containing the dissolved salts of the plating metals and buffering salts, wherein the pH of said bath is maintained in the range of from pH 7 to about pH 12 by the addition of a base selected from the group consisting of alkali metal hydroxides and ammonium hydroxide, and from about 0.005% by weight to about 1.0% by weight of a lead salt based on the total plating bath composition is added thereto, whereby the resultant plating on the aluminum and aluminum alloy surfaces is deposited in the form of small, finely divided sponge-like particles not exceeding 100 micro-inches in diameter.

8. The plating bath as set forth in claim 7, wherein the base employed is ammonium hydroxide.

9. The plating bath as set forth in claim 7, wherein the base employed is ammonium hydroxide and the pH of the bath is maintained in the range of 10.0 to 11.0.

10. The plating bath as set forth in claim 7, wherein the lead salt is selected from the group consisting of lead acetate and lead citrate.

11. The plating bath as set forth in claim 7, wherein the metal salt is a metal sulfate selected from the group consisting of nickel sulfate and cobalt sulfate.

12. The plating bath as set forth in claim 7, wherein the buffering salt is selected from the group consisting of sodium citrate and sodium gluconate.

13. The plating bath as set forth in claim 7, where the metal salts are a metal sulfate selected from the group consisting of nickel sulfate and cobalt sulfate and a metal chloride selected from the group consisting of nickel chloride and cobalt chloride.

* * * * *

UNITED STATES PATENT OFFICE
CERTIFICATE OF CORRECTION

PATENT NO. : 4,028,200
DATED : June 7, 1977
INVENTOR(S) : Kostas F. Dockus

It is certified that error appears in the above-identified patent and that said Letters Patent are hereby corrected as shown below:

Column 8, line 61, change "glyconate" to -- gluconate --.

Signed and Sealed this

Thirteenth Day of September 1977

[SEAL]

Attest:

RUTH C. MASON
Attesting Officer

LUTRELLE F. PARKER
Acting Commissioner of Patents and Trademarks